United States Patent [19]

Honda et al.

[11] Patent Number: 5,112,421
[45] Date of Patent: May 12, 1992

[54] METHOD FOR THE PRODUCTION OF A COMPOSITE SHEET FOR ARTIFICIAL LEATHER

[75] Inventors: Yuzuru Honda; Tateo Fujii; Koji Watanabe, all of Shiga, Japan

[73] Assignee: Toray Industries, Inc., Tokyo, Japan

[21] Appl. No.: 336,606

[22] Filed: Apr. 7, 1989

Related U.S. Application Data

[63] Continuation of Ser. No. 912,125, Sep. 26, 1986, abandoned.

[30] Foreign Application Priority Data

Sep. 27, 1985 [JP] Japan .................. 60-212279

[51] Int. Cl.$^5$ ............................... B32B 5/06
[52] U.S. Cl. ..................... 156/148; 156/250; 428/236; 428/238; 428/330; 428/904; 28/107; 28/112
[58] Field of Search ............... 156/148, 250; 428/904, 428/234, 235, 238, 91, 300; 28/107, 159, 163, 112; 57/243; 162/358, DIG. 1

[56] References Cited

U.S. PATENT DOCUMENTS

| | | | |
|---|---|---|---|
| 1,651,535 | 12/1927 | McDermott | 28/112 |
| 2,991,536 | 7/1961 | Moler | 28/107 X |
| 3,086,276 | 4/1963 | Bartz et al. | 428/234 X |
| 4,145,468 | 3/1979 | Mizoguchi et al. | 428/904 X |
| 4,425,392 | 1/1984 | Oikawa et al. | 428/234 X |
| 4,475,330 | 10/1984 | Kimura et al. | 57/243 X |
| 4,489,125 | 12/1984 | Gagnon | 428/300 X |
| 4,520,059 | 5/1985 | Worrall et al. | 428/235 X |
| 4,533,594 | 8/1985 | Buchanan | 428/235 X |
| 4,587,142 | 5/1986 | Higuchi et al. | 428/904 X |

FOREIGN PATENT DOCUMENTS

82583/82  5/1982  Japan.

Primary Examiner—Michael W. Ball
Assistant Examiner—Jeff H. Aftergut
Attorney, Agent, or Firm—Cushman, Darby & Cushman

[57] ABSTRACT

A soft and strong composite sheet for an artificial leather is provided by superimposing a fabric or woven or knitted construction and a non-woven fiber web, anchoring fibers of the non-woven fiber web with the fabric by needle punching to form a composite sheet and thereafter coating or impregnating the composite sheet with a binder solution. The fabric is constructed at least partly from high twist multifilament yarn and the non-woven fiber web is constructed from fibers having an average fiber length of at least 20 mm, the number of fibers being at least 10 fibers/cm$^2$.

23 Claims, 1 Drawing Sheet

METHOD FOR THE PRODUCTION OF A COMPOSITE SHEET FOR ARTIFICIAL LEATHER

This is a continuation of application Ser. No. 06/912,125, filed Sep. 26, 1986, which was abandoned upon the filing hereof.

BACKGROUND OF THE INVENTION

1. Field of the Invention

This invention relates to a composite sheet of high strength and high softness and a method of making it. The composite sheet of this invention can also be easily made thin, light, and wear resistant and is especially suitable for artificial leather.

2. Description of the Prior Art

Conventionally, high quality artificial leather has been made by impregnating with a binder a nonwoven sheet of ultrafine fibers. However a large amount of binder spoils the softness and suppleness of the composite sheet and a small amount of binder does not bring about high strength and wear resistance to the nonwoven sheet. Therefore high softness and low elongation which is necessary for some uses did not exist together in conventional non-woven sheet.

U.S. Pat. No. 4,368,227 discloses artificial leather which comprises a woven or knitted fabric and a non-woven fabric firmly bonded to the woven or knitted fabric. However, the strength, wear resistance and the softness have their own limit, because in the known fabrics such as this, a large amount of a binder is indispensable. The reason is, in the known fabrics, very short fibers (10 mm or less) are used to ease intertwining of the short fiber by water jet with the woven or knitted fabric. The very short fibers bring about the composite sheet weakness and allow the short fibers to fall off easily. The high pressure fluid jet applied in the manufacture of these known fabrics is not suitable for intertwining short fibers of ordinary length (20 mm or more) with the woven and knitted fabric. On the other hand, needle punching which is suitable for intertwining short fibers of ordinary length has not been applicable for the same purpose because it causes breakage of the woven or knitted fabric. Further when the broken fibers are exposed on the surface of the composite sheet, the appearance is seriously damaged.

SUMMARY OF THE INVENTION

It is an object of the present invention to provide an artificial leather which eliminates the problems encountered with the prior art products described above and which has excellent softness, strength and wear resistance.

The present invention provides a composite sheet comprising a woven or knitted fabric, a non-woven layer, fibers of which are intertwined with the said fabric, and a binder, wherein the said fabric is constructed at least partly from a high twist yarn and the non-woven layer has therein a number of relatively long fibers of a length greater than 20 mm, which number is at least 10 fibers/cm$^2$.

The present invention also provides a method of making a composite sheet comprising a woven or knitted fabric and a non-woven layer, fibers of which are intertwined with the said fabric, wherein the said fabric is constructed at least partly from a highly twisted yarn and wherein a fiber web and the said fabric are superposed and intertwined by needle punching, and thereafter bound with a binder.

DESCRIPTION OF THE PREFERRED EMBODIMENTS

Figure 1:
FIG. 1 shows an enlarged (75 times) cross-section of an artificial suede of a composite sheet of this invention. In this drawing (a) represents short fibers intertwined with the warp ($b_1$) and weft ($b_2$) of a high twist yarn (b) which constitute a woven fabric. The short fibers (a) and the woven fabric are further bound with a binder (c). At the surface of the composite sheet, the short fibers constitute napped fibers.

In the method of this invention, it is important to use high twist yarn. At the needle punching stage, small barbs of needle hooks easily break fibers of ordinary thickness but not thick fibers. However, in a high twist yarn, fibers in the yarn are themselves bound firmly and act like one thick fiber and cannot be hooked with the small barbs. Thus, the small barbs hook only fibers of the non-woven web and do not damage the woven or knitted fabric of a high twist yarn. The number of twists is, preferably at least 700 turns/meter (hereinunder, shown as t/m), more preferably more than 1000 t/m and most preferably, more than 1500 t/m. When it is less than 700 t/m, the twist yarn tends to be broken with the barbs during needle punching. For that reason, the resulting composite sheet is weak and tends to be low in elongation. Furthermore, the broken fibers often come out to the surface and spoil the appearance of the product, and further, cause unnecessary entanglement with the short fibers, so making the composite sheet stiff. However, too large a number of twists also causes stiffness of the product and insufficient intertwining with the short fibers. Therefore, a number of twists of not more than 4000 t/m is preferable.

Any kind of high twist yarn may be used, such as multi-filament yarn, spun yarn or a composite yarn thereof. However multi-filament yarn is most preferable, because spun yarn tends to be damaged by needles.

The weight of the woven or knitted fabric is preferably 20 to 200 g/m$^2$, more preferably, 30 to 150 g/m$^2$. When the weight is less than 20 g/m$^2$, the dimensional stability may become too inferior to be superposed and intertwined with a fiber web uniformly. In other words, unfavorable creases of the fabric remain in the product. On the other hand, when the weight of the fabric is more than 200 g/m$^2$, the structure of the woven or knitted fabric may become too dense to be intertwined with short fibers.

For the woven or knitted fabric, any kind of knitted fabric, such as warp knit, weft knit for example tricot knit, and lace stitch or composite knit thereof, and any kind of woven fabric, such as plain, twill, satin or composite weaves thereof can be used.

It is preferable to use high twist yarn for all of the constituents of the fabric, for example, as warp and weft of the woven fabric. However, some of the fabric constituents may not be high twisted yarn. In such a case, barbs of needle should be oriented parallel to the orientation of such other yarn. The barbs do not hook fibers which are oriented parallel thereto. The needle has an effective throat depth $D_a$ as follows.

$$D_a = D \cos\theta$$

wherein,

D: actual throat depth

θ: angle between orientation of the barb and fiber

By proper orientation, the barb does not damage the woven or knitted fabric and yet the effect of the intertwining is not decreased.

As the weft of the woven fabric, a co-twist yarn of S or Z twist yarns, or a co-twist yarn of S and Z twist yarns such as S-Z of 1-1, 2-2, 4-4 are preferably used. By these variations, crepe or striped crepe composite fabric can be obtained by releasing latent torque before or after impregnating a binder. The developing of such crepe can be done by the same treatment as the treatment for ordinary high twist woven fabric (forming a crepe surface texture by randomly creasing in flowing hot water). Furthermore, if the latent torque is released under mild conditions, softness of the product is improved greatly but without developing crepe. In other embodiments, such as by developing crepe of the fabric before superposing on the fiber web, an increase of the elongation of the final product can be achieved.

The total thickness of the high twist yarn may be 30 to 300 denier. Smaller thickness improves uniformity of the product but often causes damage of the woven or knitted fabric. Larger thickness may also cause damage of the woven or knitted fabric because the needle cannot slip over the thick yarn. A most preferable range is 50 to 150 denier.

By the method of the present invention, the load on the needle at the needle punching stage can be decreased unexpectedly, and even a knit density of 40 gage or 45 gage can be applied without problem. Similarly, the sum of the densities of warp and weft of the woven fabric can be more than 60, for example 120 yarns/inch, in some cases, more than 200 yarns/inch. These high density fabrics rather improve intertwining and strength of the products.

Materials for the woven and knitted fabric can be chosen arbitrarily according to the properties of the final product. For instance, synthetic fibers such as polyester, polyamide, polyacrylonitrile and aramide; natural fibers such as cotton, wool and silk; regenerated fibers such as rayon; and semi synthetic fibers such as acetate can be used.

The weight ratio of the woven or knitted fabric/non-woven layer in the final product is preferably less than 70/100, more preferably from 10 to 50/100. When the ratio is more than 70/100, the woven or knitted structure tends to be exposed on the surface of the final product.

As the fiber which constitutes the non-woven layer, fine fiber not more than 0.8 denier or composite fiber convertible into a bundle of fine fibers of not more than 0.8 denier is preferable. Fine fibers improve softness and smoothness of artificial leather. Especially, fine fiber naps improve surface appearance of artificial suede. More preferably the fine fiber denier should be not more than 0.4 denier, and 0.1 denier, even 0.001 denier or less may be used. However the composite fiber convertible into a bundle of fine fibers may be thick, for example, it may be 1 to b 10 denier.

A non-woven layer which does not include relatively long fibers of more than 20 mm shows poor abrasion resistance, because the entanglement of the fibers with each other and with the fabric is very weak. However, a non-woven layer having relatively long fibers of not less than 20 mm length shows markedly improved abrasion resistance. The relatively long fibers strengthen the effect of anchoring the non-woven layer to the fabric. That is, by the anchoring effect, even relatively short fibers are prevented from falling off from the composite sheet. This anchoring effect is very important because, in the process for making artificial leather, especially artificial suede, a considerable amount of the constituent fibers of the web are cut into very short fibers by buffing or slicing. The number of the relatively long fibers (at least 20 mm length) should be at least 10 fibers/cm$^2$, preferably 50 fibers/cm$^2$, more preferably 100 fibers/cm$^2$.

The fibers of the non-woven web, hereinunder referred to as "short fibers" (because they tend to be shorter than those of the woven fabric) are preferably those capable of conversion to fine fiber bundles.

As the composite fiber convertible into fine fiber bundles, multi-core fibers such as islands-in-a-sea type, e.g. as disclosed in U.S. Pat. No. 3,531,368, and easily separable type fibers, e.g. as disclosed in U.S. Pat. No. 4,073,988 can be used. As the sea component to be removed from the islands-in-a-sea type fiber, one, two or even more fibers selected from polystyrene homo- or copolymer of styrene, PVA, copolyester, or copolyamide can be used.

By intertwining, a large number of short fibers are passed up and down through the structure of the woven or knitted fabric, and the integrated sheet cannot be peeled off without breakage of the sheet structure.

Preferred materials for the fine fibers are polyesters such as polyethylene terephthalate (hereinunder referred to as PET), polybutylene terephthalate (PBT) and polyester elastomers; polyamides such as nylon 6, nylon 66 and polyamide elastomers; polyurethane, polyolefin, and polyacrylonitrile. Among these, PET, PBT, nylon 6 and nylon 66 are most preferred owing to the hand and appearance of the final product.

As the binder, any elastic binder such as polyurethane, SBR (styrene-butadiene rubber), NBR (nitrile-butadiene rubber), polyamino acid, and acrylic binder can be used. The elastic binder may be imparted to the composite by impregnation or coating of a solution or emulsion, such as a latex. The solidification method may be wet coagulation or drying.

The non-woven web is usually formed by a card, cross lapper or random webber, is placed on or under the woven or knitted fabric and is needle punched together with the fabric, at least from one side, preferably from both sides. The needles should be selected in relation to the kind of the fabric, but usually, the throat depth of the barbs is 30 to 150 microns, preferably 50 to 100 microns. To avoid damage of the fabric by the needles, the orientation of the barbs should not be perpendicular to the high twist yarn, that is to say, an angle between orientations of the barbs and the high twist yarn should be in the range 10° to 80°, most preferably 45° to show good results. In such a case, it is preferable that all the barbs are oriented in the same direction. Most preferably, needles with one barb are used. However, a conventional type of needle which has more than two barbs can be used.

Typical combinations of the fabric and the web at superposing are as follows:

1) W/F
2) W/F/W
3) F/W/F
4) W/F/F/W
5) W/F/W/F/W wherein:

W = web

F = woven or knitted fabric

For example, in case (1) a fabric and a web are superposed and then needle punched (intertwined). By the needle punching, the short fibers pass through and are intertwined with the fabric and both surfaces of the fabric are covered with the intertwined short fibers. In case (4), by the needle punching, some short fibers pass through the upper fabric but not through lower fabric, that is, some short fibers are trapped between the two fabrics. Thus, in all of these cases, even in cases (3) and (4), both sides of each of the fabrics are filled with the intertwined short fibers. Accordingly, all of the resulting multilayer structures of (3) to (5) are W/F/W/F/W. In case (5), a fiber web is inserted between the two fabrics for controlling the thickness of the intertwined non-woven layer of the middle part. In case (3) to (5), the needle punched sheet may be used as it is to make a thick product or may be separated between the two fabrics to make two thin products. In case (3), for splitting the two fabrics without their breakage, slicing must be applied because they are strongly connected with the middle non-woven layer. In case (4), the needle punched sheet can be split between the two fabrics by peeling them apart from each other. However, the stronger the intertwining, the harder the splitting. To avoid this problem, the splitting should preferably be conducted once before the intertwining becomes strong, the split sheets then being superposed on one another again and needle punched together again. In this way, in case (4), repeated steps of needle punching and splitting are usually applied to obtain two sheets without damaging the sheets at the splitting.

In any of these cases, the web may be needle punched before superposing. By slight needle punching before the superposing, unfavorable creasing of the fabric during successive needle punching can be avoided. This is especially, when a cross lapper web is used, because in such a case shrinkage of the web by needle punching is larger in the width direction than in the longitudinal direction owing to the fiber orientation of the web, so creasing of fabric easily occurs.

The amount of the binder is preferably 7 to 50%, more preferably 10 to 40% based on the weight of the fibers in the product. These amounts are about a half of the prior art such as disclosed above, or ordinary artificial suede which has not fabric therein.

To convert the short fibers into fine fiber bundles, it is preferable to remove one component from multi-core composite fibers. Usually, the removal is carried out by extracting one component of the composite fiber with a solvent. However, in some cases, the removal can be carried out by decomposing one component by heat or a chemical such as acid. The converting may be carried out before or after imparting the binder. For making artificial suede, the surface of the composite sheet is buffed, usually with sand paper.

By buffing after impregnation of the binder, dense naps on the surface can be obtained. In this invention, the strong intertwining between the naps and the base fabric brings about excellent wear resistance of the composite sheet. In other words, the naps intertwine firmly with the base fabric and don't fall off easily.

Hereinunder, this invention will be described in more detail with reference to Examples. The physical properties of the composite sheets were determined according to the following procedures.

Drape Stiffness: JIS (Japanese Industrial Standard)-L1079, 5.17 A (a method which is substantially the same as ASTM D1388 except the angle of 41.5° was changed to 45°).

Strength and Elongation: JIS-L1079, 5.12.1

Abrasion Resistance: Oscillatory Cylinder Method of ASTM D1175.

Air Pressure: 0.281 kg/cm$^2$

Load: 0.454 kg

Abrasion velocity (strokes/min.): 125+5

Revolution of Sample: 1 rev./100 strokes (48 sec)

Stroke: 2.54 cm

Paper: #400

Number of relatively long fibers: Each sample was cut into a square piece of 20 cm × 20 cm and the polyurethane (PU) was dissolved out with dimethylformamide, and dried. The 1 cm × 1 cm square at the center of the PU-dissolved sheet was colored black with ink. The colored nap fibers were pulled off with a pincette and the number of relatively long fibers, i.e. fibers of a length greater than 20 mm, was counted. After repeating this procedure and when the number of the relatively long fiber was greater than 10, the total number of the relatively long fibers in the colored area was extrapolated from the total weight of the fibers pulled off.

EXAMPLE 1

Islands-in-a-sea type composite fibers (island component; polyethylene terephthalate: sea component; polystyrene: island/sea weight ratio; 80/20: number of islands; 16: thickness of the composite fiber; 3 denier: length; 51 mm: number of crimps; 14 crimps/inch) are formed into two webs through a card and crosslapper and slightly needle punched at needle density of 100 needles/cm$^2$. Each web has a weight of 180 g/m$^2$. A plain weave of untextured high twist yarn (weight; 90 g/m$^2$ constituent yarn; 76 D-36 filaments, number of twists; 2000 t/m) was inserted between the two webs so that the webs and the fabric are superimposed on one another to form a sheet. Next, the sheet was needle punched at a needle density of 2500 needles/cm$^2$, needle depth of 7 mm, random orientation of barbs. The resulting sheet was firmly intertwined without damage by the needles and had a weight of 380 g/m$^2$. The latent torque of the constituent high twist yarn was released by immersing the resulting sheet in 98° C. hot water and the sheet was impregnated with PVA solution and dried. The solid weight of the impregnated PVA was 35% based on the weight of the island component. Next, the dried sheet was impregnated with a DMF solution of polyurethane and coagulated in water. The coagulated sheet was repeatedly immersed and squeezed in hot water and the PVA and the DMF were removed. Naps were formed on the sheet by a buffing machine and the buffed sheet was dyed with a disperse dye using a circular type dyeing machine. An artificial suede having 1.18 mm thickness, 44 g/m$^2$ weight and 0.378 g/cm$^3$ density was obtained. The artificial suede was, as shown in Table 1, soft, strong, highly wear resistant and low in elongation. It was suitable for cover sheet of car chair, sports shoes and covering for furnitures.

COMPARATIVE EXAMPLE 1

The same procedures as Example 1 were repeated. However, the woven fabric of high twist yarn in Example 1 was substituted by an ordinary taffeta (material; polyethylene terephthalate: construction; 75D-36f:

number of twists; 300). The obtained composite sheet was inferior in tensile strength, had relatively high elongation and further, broken fibers of the taffeta were intertwined with the fine short fibers and exposed on the sheet surface which brought about stiffness and uneven appearance of the product.

COMPARATIVE EXAMPLE 2

The same procedures as Example 1 are repeated for the short fiber webs except that the woven fabric of high twist yarn was not inserted between the webs. The obtained sheet was inferior in strength, wear resistance and had too high an elongation for use, for example a cover sheet for a car chair, for sports shoes, or as a covering for furniture.

TABLE 1

|  | Example 1 | Comparative Examples 1 | 2 |
|---|---|---|---|
| Weight (g/m$^2$) | 446 | 442 | 438 |
| Tensile Strength (kg/cm) | | | |
| length | 15.2 | 12.7 | 10.5 |
| width | 14.8 | 12.3 | 9.8 |
| Tensile Elongation (%) | | | |
| length | 48 | 65 | 101 |
| width | 51 | 72 | 112 |
| Custom Abrasion (cycles) | 18500 | 7500 | 4200 |
| Flex rigidity (mm) | 43 | 51 | 42 |
| Appearance | good | bad | good |
| Number of Relatively Long Fibers (fibers/cm$^2$) | >1300 | >2900 | >5500 |

EXAMPLE 2

A W/F/F/W type felt was formed using the same fiber and fabric as Example 1 according to the following procedures:

Sheet A making a needle-punched web having area weight of 250 g/m$^2$ at a needle density of 150 needles/cm$^2$.

Sheet B superposing Sheet A on a fabric and needle-punching them together at a needle density of 150 needles/cm$^2$ and a needle depth of 7 mm.

Sheet C superposing two of the Sheets B in a W/F/F/W arrangement and needle-punching them from one side at a needle density of 200 needles/cm$^2$.

Sheet B$_1$ peeling Sheet C between the two fabrics.

Sheet C$_1$ superposing Sheet B$_1$ again in W/F/F/W arrangement and needle-punching them from the opposite side at a needle density of 200 needles/cm$^2$.

Sheet C$_7$ repeating the same procedures for making Sheets B$_1$ and C$_1$ seven times in the same order.

Sheet C$_7$ was immersed in hot water, dried and then the sea component was removed by repeated immersing and squeezing in trichlorethylene. Next, the sheet was impregnated with polyurethane solution and coagulated in water as described in Example 1. The coagulated sheet is dried and split by peeling into two sheets. The split sheets were buffed on both surfaces, crumpled in hot water at 98° C. and dried. The obtained suede-like sheet was very supple, strong and showed excellent and more glittering appearance than the product of Example 1. Its abrasion resistance was more than 20,000 cycles. The number of relatively long fibers was 78 fibers when 5.3 mg (72 weight of the non-woven layer of the colored area) fibers were pulled off which is equivalent to a number of relatively long fibers of 108 fibers/cm$^2$.

COMPARATIVE EXAMPLE 3

Islands-in-a-sea type fibers of 5 mm length were suspended in water and formed into a paper-like sheet with a net screen. The islands-in-a-sea type fiber was the same as that used in Example 1 except it had a length of 5 mm, island/sea ratio of 57/43 and a number of islands of 36. Four plies of this sheet were superposed with the same fabric as Example 1 and needle punched. But most of the fibers showed no entanglement with each other and with the fabric, and many fibers had fallen off by the end of the needle punching stage. Further, when the needle punched sheet was immersed in hot water, most of the remaining short fibers had fallen off from the fabric and subsequent treatment was abandoned.

We claim:

1. A method of making a composite sheet comprising a fabric which is either of a woven or knitted construction and a non-woven fiber web, comprising the steps of:
   a) superimposing on one another said fabric which is constructed at least partly from high twist multifilament yarn of at least 1000 t/m, and said non-woven fiber web which is constructed from fibers having an average fiber length of at least 20 mm;
   b) anchoring fibers of said non-woven fiber web with said fabric by needle punching, while keeping said fibers of said non-woven fiber web substantially free from intertwining with filaments of said multifilament yarn, to form said composite sheet, and
   c) coating or impregnating said composite sheet with a binder solution.

2. The method of making a composite sheet according to claim 1, wherein an average thickness of said fibers which constitute said non-woven fiber web is not more than 0.8 denier.

3. The method of making a composite sheet according to claim 2, wherein at least two fabrics are used, and said composite sheet is split at a region between said fabrics to make at least two composite sheets either before of after impregnation.

4. The method of making a composite sheet according to claim 3, wherein said composite sheets which have been split at a region between said fabrics are recombined by superimposing one sheet on another and needle punched and split at least twice.

5. The method of making a composite sheet according to claim 3, wherein said composite sheet is split by slicing.

6. The method of making a composite sheet according to claim 1, wherein said multifilament yarn has a thickness of 30 to 300 denier.

7. The method of making a composite sheet according to claim 6, wherein said thickness of said multifilament yarn is 50 to 150 denier.

8. The method of making a composite sheet according to claim 1, wherein said fabric has a weight of 20 to 200 g/m$^2$.

9. The method of making a composite sheet according to claim 8, wherein said weight of said fabric is 30 to 150 g/m$^2$.

10. The method of making a composite sheet according to claim 1, wherein said fibers which constitute said non-woven fiber web are fibers which are convertible into fine fibers of not more than 0.8 denier and the conversion is conducted after said needle punching.

11. The method of making a composite sheet according to claim 1, wherein the number of twists of said high twist multifilament yarn is not more than 4000 t/m.

12. The method of making a composite sheet according to claim 1, wherein both warp and weft of said fabric of woven construction consists of high twist multifilament yarn.

13. The method of making a composite sheet according to claim 1, wherein said needle punching is conducted with needles having a longitudinal axis and barbs, wherein said barbs of said needles are oriented at a 10° to 80° angle with respect to the axis of said high test multifilament yarn.

14. The method of making a composite sheet according to claim 1, wherein said non-woven fiber web is needle punched prior to superimposing said non-woven fiber web and said fabric on one another.

15. The method of making a composite sheet according to claim 1, wherein said composite sheet is coated with a binder solution.

16. The method of making a composite sheet according to claim 1, wherein said composite sheet is impregnated with a binder solution.

17. The method according to claim 1, wherein said high twist multifilament yarn has more than 1500 t/m.

18. The method of making a composite sheet according to claim 1, wherein said multifilament yarn is an untextured multifilament yarn.

19. The method of making a composite sheet according to claim 1, wherein a weight ratio of said fabric/non-woven fiber web is less than 70/100.

20. The method of making a composite sheet according to claim 1, wherein a weight ratio of said fabric/non-woven fiber web is 10 to 50/100.

21. The method of making a composite sheet according to claim 1, wherein at least one side which is opposite to said fabric of said composite sheet is buffed.

22. The method of making a composite sheet according to claim 1, wherein an amount of said binder solution is 7 to 50% based on the weight of said fibers.

23. The method of making a composite sheet according the claim 1, wherein said fibers are cut fibers.

* * * * *